(No Model.)
A. FAY.
CHURN.
No. 468,013. Patented Feb. 2, 1892.
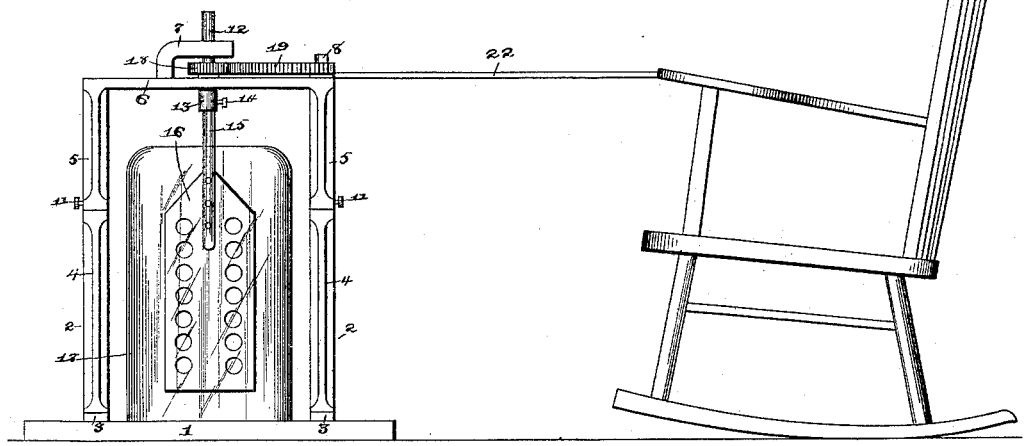
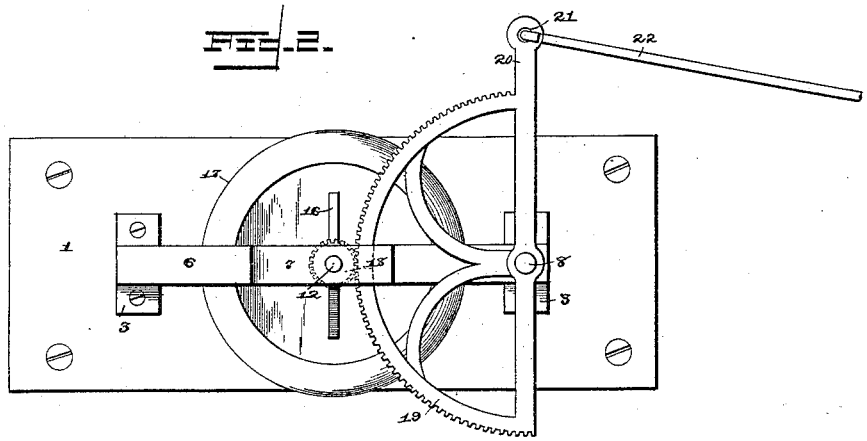
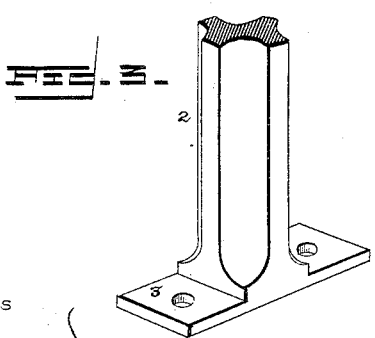
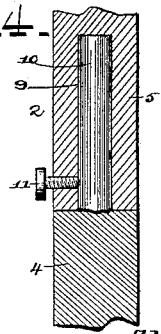
Witnesses
E. S. Duvall Jr.
N. T. Riley
Inventor
Alpheus Fay.
By his Attorneys.
C. A. Snow & Co.

UNITED STATES PATENT OFFICE.

ALPHEUS FAY, OF CINCINNATI, OHIO.

CHURN.

SPECIFICATION forming part of Letters Patent No. 468,013, dated February 2, 1892.

Application filed May 7, 1891. Serial No. 391,936. (No model.)

*To all whom it may concern:*

Be it known that I, ALPHEUS FAY, a citizen of the United States, residing at Cincinnati, in the county of Hamilton and State of Ohio, have invented a new and useful Churn, of which the following is a specification.

The invention relates to improvements in churns.

The object of the present invention is to simplify and improve the construction of churns and to render the frame, which supports the operative parts, stable and adjustable in height to suit large and small churn-bodies.

The invention consists in the construction and novel combination and arrangement of parts hereinafter fully described, illustrated in the accompanying drawings, and pointed out in the claim hereto appended.

In the drawings, Figure 1 is a side elevation of a churn embodying the invention. Fig. 2 is a plan view. Fig. 3 is a detail view of a portion of one of the standards. Fig. 4 is a detail sectional view through the standard-joint.

Referring to the accompanying drawings, 1 designates a base constructed of wood or other suitable material, and 2 designates standards rising from the base and constructed of metal and provided at their lower ends with feet 3, which are perforated and secured to the base by screws. The standards are flanged to insure strength, and are composed of lower sections and upper sections 5, and are connected at their upper ends by an integral cross-bar 6, which is provided intermediate its ends with an L-shaped arm 7 and near one end with a vertically-disposed stub-shaft 8. The sections 4 and 5 of the standards are adjustable to enable a frame to receive large and small churn-bodies and to enable the dasher to be adjusted within a churn-body to suit the quantity of cream to be churned, and the upper sections 5 are provided with longitudinal sockets 9 to receive integral stems 10, projecting from the lower sections 4 and forming vertical longitudinal extensions of the same. The sections are secured at the desired adjustment by set-screws 11, arranged on the upper sections and adapted to engage the stems 10.

The cross-bar 6 and the L-shaped arm 7 are provided with suitable bearings and journaled in the bearings with a vertically-disposed dasher-shaft 12, which is provided at its lower end with a socket 13 and a set-screw 14, adapted to engage the upper end of a dasher-rod 15, which is arranged in the socket and carries the dasher 16. The dasher 16 is arranged within a suitable churn-body 17, and may, if desirable and necessary, be adjusted in the same to operate with the greatest advantage upon the cream to be churned. The dasher-shaft 12 carries a pinion 18, which is engaged by an oscillating segment 19, mounted on the stub-shaft 8 and provided at one end with an extension 20, and the latter has its outer end provided with an opening 21 and is connected with a rocking-chair by a rod 22, which has one end secured in the opening 21 of the extension. The segment 19, which is provided with teeth at its curved edge, is oscillated by the rocking-chair which operates the churn. The churn-frame is steady and stable, and the upper sections of the standards can be raised and lowered to fit any churn-body.

What I claim is—

The churn having the surrounding frame made in sections, the lower section being rigidly mounted in place and the upper section being removable, the dasher-shaft mounted in the upper section, the dasher removably coupled thereto, the pinion carried by the dasher-shaft, the horizontally-disposed segment gearing with the pinion and mounted on the upper section of the frame and provided with an extension-arm 20, and the connecting-rod 22, coupled to the arm 20 and adapted to be connected to a rocking-chair or other source of power, combined and arranged whereby the upper section of the frame carries all the operating mechanism, substantially as described.

In testimony that I claim the foregoing as my own I have hereto affixed my signature in presence of two witnesses.

ALPHEUS FAY.

Witnesses:
C. C. REAKIRK,
JO. BURDSAL.